(12) United States Patent
Lee

(10) Patent No.: US 7,938,463 B2
(45) Date of Patent: May 10, 2011

(54) BUMPER APPARATUS WITH MULTISTAGE ENERGY ABSORBING STRUCTURE

(75) Inventor: Hun Hyoo Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 12/323,449

(22) Filed: Nov. 25, 2008

(65) Prior Publication Data

US 2009/0152883 A1 Jun. 18, 2009

(30) Foreign Application Priority Data

Dec. 18, 2007 (KR) ........................ 10-2007-0133098

(51) Int. Cl.
*B60R 19/04* (2006.01)
(52) U.S. Cl. .................................. 293/120; 296/187.03
(58) Field of Classification Search .................. 293/106, 293/120, 121, 122, 132, 133; 296/187.04, 296/187.03
See application file for complete search history.

(56) References Cited

U.S. PATENT DOCUMENTS

| | | | | |
|---|---|---|---|---|
| 2,728,479 A * | 12/1955 | Wheeler | | 217/35 |
| 2,998,214 A * | 8/1961 | Peterman | | 244/138 R |
| 3,432,200 A * | 3/1969 | Barton | | 293/122 |
| 3,506,295 A * | 4/1970 | Yancey | | 293/133 |
| 3,888,531 A * | 6/1975 | Straza et al. | | 293/120 |
| 4,029,350 A * | 6/1977 | Goupy et al. | | 293/110 |
| 4,413,856 A * | 11/1983 | McMahan et al. | | 296/187.03 |
| 4,542,925 A * | 9/1985 | Huber et al. | | 293/120 |
| 4,940,270 A * | 7/1990 | Yamazaki et al. | | 293/122 |
| 5,056,840 A * | 10/1991 | Eipper et al. | | 293/120 |
| 5,123,688 A * | 6/1992 | Takado et al. | | 293/120 |
| 5,431,463 A * | 7/1995 | Chou | | 293/110 |
| 5,518,802 A * | 5/1996 | Colvin et al. | | 428/178 |
| 5,551,673 A * | 9/1996 | Furusawa et al. | | 267/160 |
| 6,231,094 B1 * | 5/2001 | Uytterhaeghe et al. | | 293/122 |
| 6,286,879 B1 * | 9/2001 | Haque et al. | | 293/120 |
| 6,315,339 B1 * | 11/2001 | Devilliers et al. | | 293/132 |
| 6,435,579 B1 * | 8/2002 | Glance | | 293/155 |
| 6,474,708 B1 * | 11/2002 | Gehringhoff et al. | | 293/120 |
| 6,554,333 B2 * | 4/2003 | Shimotsu et al. | | 293/132 |
| 6,682,128 B2 * | 1/2004 | Carroll et al. | | 296/187.03 |
| 6,695,366 B2 * | 2/2004 | Cherry | | 293/120 |
| 6,758,507 B2 * | 7/2004 | Tarahomi et al. | | 293/120 |
| 6,802,548 B2 * | 10/2004 | Shimotsu | | 293/133 |
| 6,863,322 B2 * | 3/2005 | Hunter et al. | | 293/120 |
| 7,093,866 B2 * | 8/2006 | Toneatti et al. | | 293/133 |
| 7,131,674 B2 | 11/2006 | Evans et al. | | |
| 2008/0001417 A1 * | 1/2008 | Asahi et al. | | 293/155 |

* cited by examiner

*Primary Examiner* — Glenn Dayoan
*Assistant Examiner* — Pinel E Romain
(74) *Attorney, Agent, or Firm* — Morgan, Lewis & Bockius LLP

(57) ABSTRACT

A bumper apparatus with a multistage energy absorbing structure mounted to the front and rear ends of a vehicle. The bumper apparatus includes a back beam, a rear shock absorber, a front shock absorber, and a bumper cover. The back beam is mounted to a car body. The rear shock absorber is mounted to the front surface of the back beam and has a plurality of rear shock absorbing units on a middle portion thereof. The front shock absorber is mounted to the front surface of the rear shock absorber and has an arcuate cross-sectional structure. The bumper cover is mounted to the front surface of the front shock absorber.

9 Claims, 6 Drawing Sheets

BUMPER APPARATUS WITH MULTISTAGE ENERGY ABSORBING STRUCTURE

CROSS-REFERENCE TO RELATED APPLICATIONS

This application claims priority to Korean Application No. 10-2007-0133098, filed on Dec. 18, 2007, the disclosure of which is incorporated herein by reference.

BACKGROUND OF THE INVENTION

1. Field of the Invention

The present invention relates, in general, to bumpers mounted to the front and rear ends of vehicles and, more particularly, to a bumper apparatus with a multistage energy absorbing structure.

2. Description of the Related Art

A bumper apparatus of a vehicle functions to absorb shock energy applied to the front or rear end of a vehicle, thus protecting both the car body of the vehicle and passengers traveling in the vehicle.

In the related art, to meet bumper laws requiring 5-mile-per-hour bumper standard, a conventional bumper apparatus comprises a shock absorber, made of EPP (expanded polypropylene) with a foaming ratio of 15, a back beam and a bumper cover. However, in Europe, a bumper apparatus having improved shock absorbing performance has been required to protect pedestrians from bumper impacts according to tougher bumper laws increased to a 2.5-mile-per-hour bumper standard, so that the bumper apparatuses in Europe use EPP with a foaming ratio of 45.

Particularly, in recent years, a bumper apparatus, which can continuously maintain the reliable shock absorbing effect in a collision and can easily restore its original shape after the collision, is required.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, exemplary embodiments of the present invention have been made keeping in mind the above problems occurring in the related art, and the present invention is intended to propose a bumper apparatus, which is provided with a multistage energy absorbing structure capable of satisfactorily meeting the requirements of bumper standards to protect pedestrians, car bodies and passengers, avoiding easy breakage of the bumper apparatus in a collision, continuously maintaining a designed shock absorbing effect, and having an improved restoring force to easily restore the original shape of the bumper apparatus after the collision.

In order to achieve the above object, according to one aspect of the present invention, there is provided a bumper apparatus comprising a back beam mounted to a car body, a rear shock absorber mounted to a front surface of the back beam and having a rear shock absorbing unit substantially on a middle portion thereof, a front shock absorber mounted to a front surface of the rear shock absorber and having an arcuate cross-sectional structure, and a bumper cover mounted to the front shock absorber.

The rear shock absorbing unit may comprise at least two-stepped cylindrical protrusion protruding forwards from the rear shock absorber. The rear shock absorber may comprise a plurality of rear shock absorbing units arranged on the middle portion and in a longitudinal direction thereof. The rear shock absorber may comprise an absorber body covering the back beam and has an asymmetrical structure, with an inclined surface defined on an upper edge of the absorber body and a right-angled surface defined on a lower edge of the absorber body. The rear shock absorber may be provided with a plurality of fitting lugs protruding rearwards from the absorber body, thus being mounted to the back beam through fitting.

The front shock absorber may have a mesh structure and a semicircular or oval cross-sectional structure. The front shock absorber may be provided with a plurality of polygonal holes, which are sequentially arranged over the front surface of the rear shock absorber. The front shock absorber may be provided with a plurality of fitting lugs, thus being mounted to the rear shock absorber through fitting.

The shock absorbing performance of the front shock absorber can be adjusted by changing thickness thereof and/or by changing a shape of holes of the mesh structure.

In another exemplary embodiment of the present invention, a bumper apparatus with a multistage energy absorbing structure may comprise: a back beam securely mounted to a car body, a rear shock absorber securely mounted to a front surface of the back beam, the rear shock absorber comprising at least a rear shock absorbing unit formed substantially on a middle portion and in a longitudinal direction thereof and an absorber body securely covering the front surface of the back beam and supporting the at least a rear shock absorbing unit, a front shock absorber securely mounted to a front surface of the rear shock absorber and covering the at least a rear shock absorbing unit, and a bumper cover securely mounted to the front shock absorber.

The rear shock absorbing unit may comprise at least two-stepped protrusion protruding forwards from the rear shock absorber and the at least two-stepped protrusion is configured to be telescopically deformable toward the back beam when an external shock is applied to the bumper cover.

The at least two-stepped protrusions of the rear shock absorbing unit may comprise: a first protrusion part extended from the absorber body, a second protrusion part aligned substantially coaxial with the first protrusion part, wherein cross-section of the second protrusion part is smaller than cross-section of the first protrusion part, and an inclined surface defined between the first protrusion part and the second protrusion part and having at least a curvature toward the first shock absorber, one end of the inclined surface connected to upper edge of the first protrusion par, and a depressed neck part, one end of the depressed neck part connected to the other end of the inclined surface, and the other end of the depressed neck part connected to lower edge of the second protrusion part, wherein a lower edge of the first protrusion part is positioned lower than the lower edge of the second protrusion part and the upper edge of the first protrusion part is positioned above the lower edge of the second protrusion part.

The first and second protrusion parts may be cylindrical.

The rear shock absorber may be provided with at least a fitting lug protruding rearwards from the absorber body, thus being mounted to the back beam through fitting.

The front shock absorber may have a mesh structure and an arcuate cross-sectional structure. The front shock absorber may be provided with a plurality of polygonal holes, which are sequentially arranged over the front surface of the rear shock absorber and provided with a plurality of fitting lugs, thus being mounted to the rear shock absorber through fitting.

The shock absorbing performance of the front shock absorber can be adjusted by changing thickness thereof and/or by changing a shape of holes of the mesh structure.

According to the present invention, the multistage impact energy absorbing structure is provided in both the front and rear shock absorbers, thus realizing a continuous and reliable shock absorbing effect, satisfactorily meeting the requirements of the recent bumper standard, and remarkably increasing the restoring force of a bumper apparatus which is capable of easily restoring its original shape after a collision.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Hereinbelow, exemplary embodiments of the present invention will be described in detail with reference to accompanying drawings.

Figure 1:
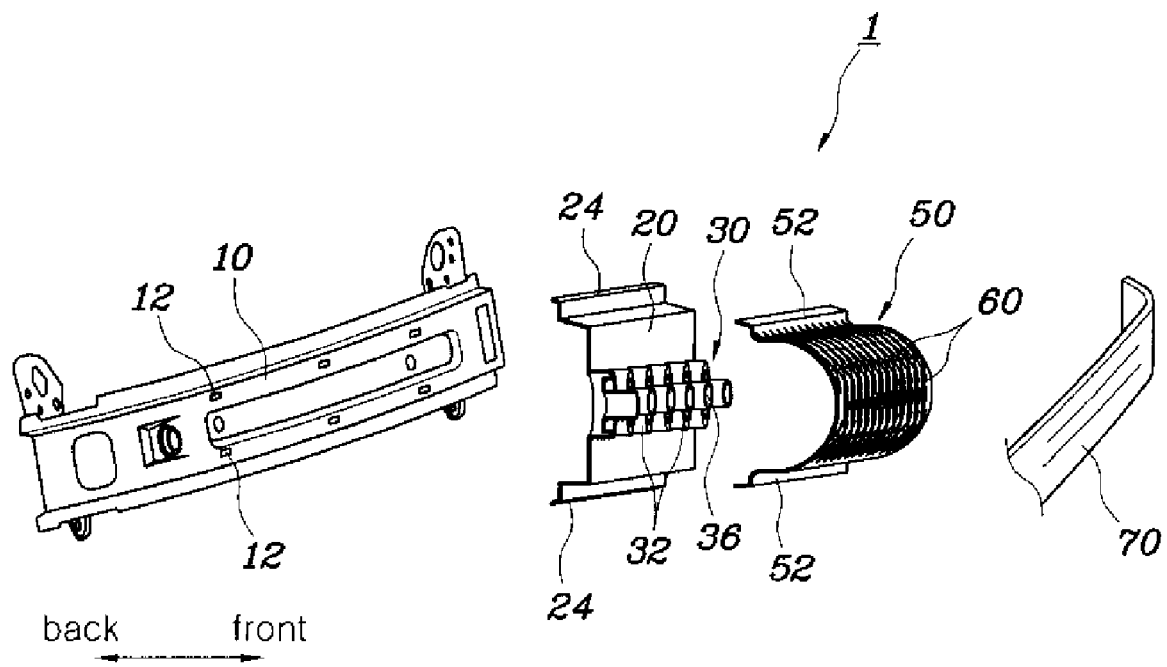
FIG. 1 is an exploded perspective view illustrating a bumper apparatus with a multistage energy absorbing structure according to the present invention.

As shown in FIG. 1, the bumper apparatus 1 according to the present invention comprises a back beam 10, a rear shock absorber 20, a front shock absorber 50 and a bumper cover 70.

The back beam 10 is mounted to a car body. The rear shock absorber 20 is mounted to the front surface of the back beam 10 and has a rear shock absorbing unit 30 on the middle portion thereof. The front shock absorber 50 is securely mounted to the front surface of the rear shock absorber 20. Further, the bumper cover 70 is securely mounted to the front surface of the front shock absorber 50.

Hereinafter a detailed explanation about the illustrative bumper apparatus of the present invention will be followed.

Figure 2:
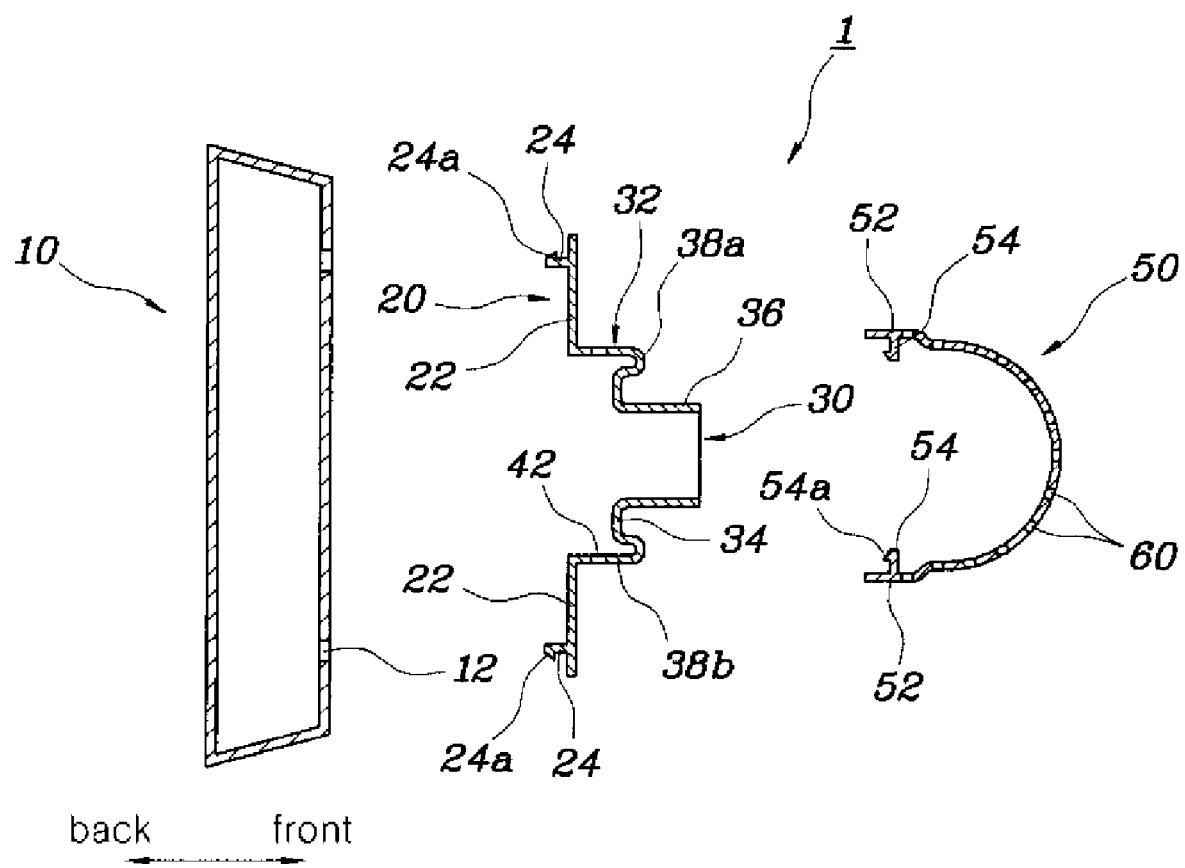
FIG. 2 is an exploded sectional view illustrating the bumper apparatus with the multistage energy absorbing structure according to the present invention.

The rear shock absorber 20 comprises an absorber body 22, which is securely mounted to the front surface of the back beam 10. In an exemplary embodiment of the present invention, the absorber body 22 is provided with a plurality of fitting lugs 24, protruding rearwards from rear surface of the absorber body 22, and is mounted to the front surface of the back beam 10 by fitting the fitting lugs 24 into fitting holes 12 formed on the front surface of the back beam 10. As shown in FIG. 2, each of the fitting lugs 24 of the absorber body 22 is provided with a locking hook 24a protruding in vertical direction of the fitting lug 24 on the end thereof, thus being fitted into and locked to an associated fitting hole 12 of the back beam 10. The fitting lugs 24 may be disposed at upper rear surface and lower rear surface of the absorber body 22 and the corresponding fitting holes 12 may also be at upper front surface and lower front surface of the back beam 10.

The rear shock absorber 20 is provided with a plurality of rear shock absorbing units 30, which are sequentially arranged substantially on the middle portion of the absorber body 22 in the longitudinal direction thereof. As shown in FIG. 1 and FIG. 2, each of the rear shock absorbing units 30 comprises at least a multi-stepped cylindrical protrusion protruding forwards from the absorber body 22. In an exemplary embodiment of the present invention, the multi-stepped cylindrical protrusion may be two-stepped protrusion.

Described in detail, the two-stepped cylindrical protrusion of the rear shock absorbing unit 30, as an example, comprises a first protrusion part 32 and a second protrusion part 36. The diameter of the first protrusion part 32 is larger than that of the second protrusion part 36. The second protrusion part 36 is aligned co-axial with the first protrusion part 32 and defined at upper portion of the first protrusion part 32 so that the second protrusion part 36 can be telescopically compressed into the first protrusion part 32 as explained hereinafter.

The first protrusion part 32 of the rear shock absorbing unit 30 protrudes forwards from front surface of the absorber body 22 and has a cylindrical structure, and the second protrusion part 36 protrudes forwards from the first protrusion part 32 forwards and has a diameter smaller than that of the first protrusion part 32.

A depressed neck part 34 is defined between upper edge of the first protrusion part 32 and lower edge of the second protrusion part 36, so that the second protrusion part 36 can be telescopically collapsed into the first protrusion part 32 with support of the first protrusion part 32 as the upper edge of the first protrusion part 32 is elastically or plastically deformed rearwards inside the first protrusion part 32 when an external shock is applied to the second protrusion part 36.

The above-mentioned rear shock absorbing units 30 are sequentially arranged on the middle portion of the front surface of the absorber body 22 in the longitudinal direction thereof.

Further, the rear shock absorber 20 further comprises an inclined surface 38a between the depressed neck part 34 and upper edge of the first protrusion part 32 and a right-angled surface 38b, i.e., a circumference portion of the first protrusion part 32 as shown in FIG. 2. In an exemplary embodiment of the present invention, the inclined surface 38a is formed to be concavely curved toward the front shock absorber 50 with a curvature so as to form a semicircular shape. Since the curvature of the inclined surface 38a increases elasticity and thus have an excellent shape-restoring characteristic, the inclined surface 38a can sustain a high bending moment made by the second protrusion part 36 when an external shock is applied thereto. Accordingly when an external shock is applied to the rear shock absorber unit 30, the rear shock absorber unit 30 can be thrust backwards with the inclined surface 38*a* acting against the shock to reduce the impact of the shock and then compressed downwards, but can restore its original shape when the shock is removed if the shock is not high enough to deform the inclined surface 38*a* and/or the first protrusion part 36 plastically.

Furthermore, since the absorber body 22 is securely mounted on the front surface of the back beam 10, the shock transferred through the rear shock absorber unit 30 is distributed on the back beam 10 and the absorber body 22 is not broken but may be elastically compressed downwards to bring its shock absorbing effect.

The bumper apparatus of the present invention further has a front shock absorber 50, which is securely mounted to the front surface of the rear shock absorber 20. The front shock absorber 50 has a mesh arcuate cross-sectional structure. The front shock absorber 50 is provided with a plurality of fitting lugs 54 in the rear portions of upper and lower flanges 52 thereof wherein the upper and lower flanges 52 extends rearwards from lower portion of the mesh arcuate cross-sectional structure. The fitting lugs 54 formed inside the flanges 52 are fitted into corresponding fitting holes 42 in the rear shock absorber 20. In an exemplary embodiment of the present invention, the fitting holes 42 are formed on the right-angled surface 38*b* of the first protrusion part 32.

Briefly described, the front shock absorber 50 has a structure, which is configured to be mounted to the rear shock absorber 20 through fitting. As shown in FIG. 2, each of the fitting lugs 54 extending inwards is provided with a locking hook 54*a* in an end thereof. The locking hook 54*a* protrudes perpendicularly to the longitudinal direction of the fitting lugs 54, so that the fitting lugs 54 can be fitted into respective fitting holes 42 in the rear shock absorber 20 and locked thereto by the locking hooks 54*a*.

In an exemplary embodiment of the present invention, the front shock absorber 50 has a structure, which covers the rear shock absorber 20 along the total length thereof. The front shock absorber 50 may have a semicircular cross-sectional structure with a plurality of polygonal holes 60. The polygonal holes 60 are sequentially arranged over the front surface of the rear shock absorber 20.

The above-mentioned polygonal mesh structure realizes excellent elasticity since frames of the polygonal mesh supports each other and external force applied to mesh is absorbed by the whole structure, thus having an excellent shape-restoring characteristic when an external shock is applied thereto. Particularly, the front shock absorber 50 preferably has an arcuate cross-section, and more preferably, an oval cross-section, such as a semicircular cross-section or a tunnel cross-section. The shape of oval cross-section also absorbs the external force applied to mesh by the whole structure. Accordingly the polygonal mesh and the shape of oval cross-section of the front shock absorber 50 has excellent elastic restoring force and high elastic resistance to external shocks.

Further, the shock absorbing performance of the front shock absorber 50 can be adjusted by changing the thickness thereof or by changing the shape of the polygonal holes 60. For example, the shock absorbing capacity of the front shock absorber 50 can be increased or reduced by changing the thickness of opposite sides such that the thickness is different from the thickness at the area around the peak of the arcuate cross-section, or by changing the shape of the polygonal holes 60 into circular holes, or by changing the number and size of the holes 60.

The bumper apparatus of the present invention further comprises a bumper cover 70, which is mounted to the front surface of the front shock absorber 50. The bumper cover 70 is placed around the front shock absorber 50, thus preventing the front shock absorber 50 from being exposed directly to the exterior and realizing a good appearance of a vehicle.

Figure 3:
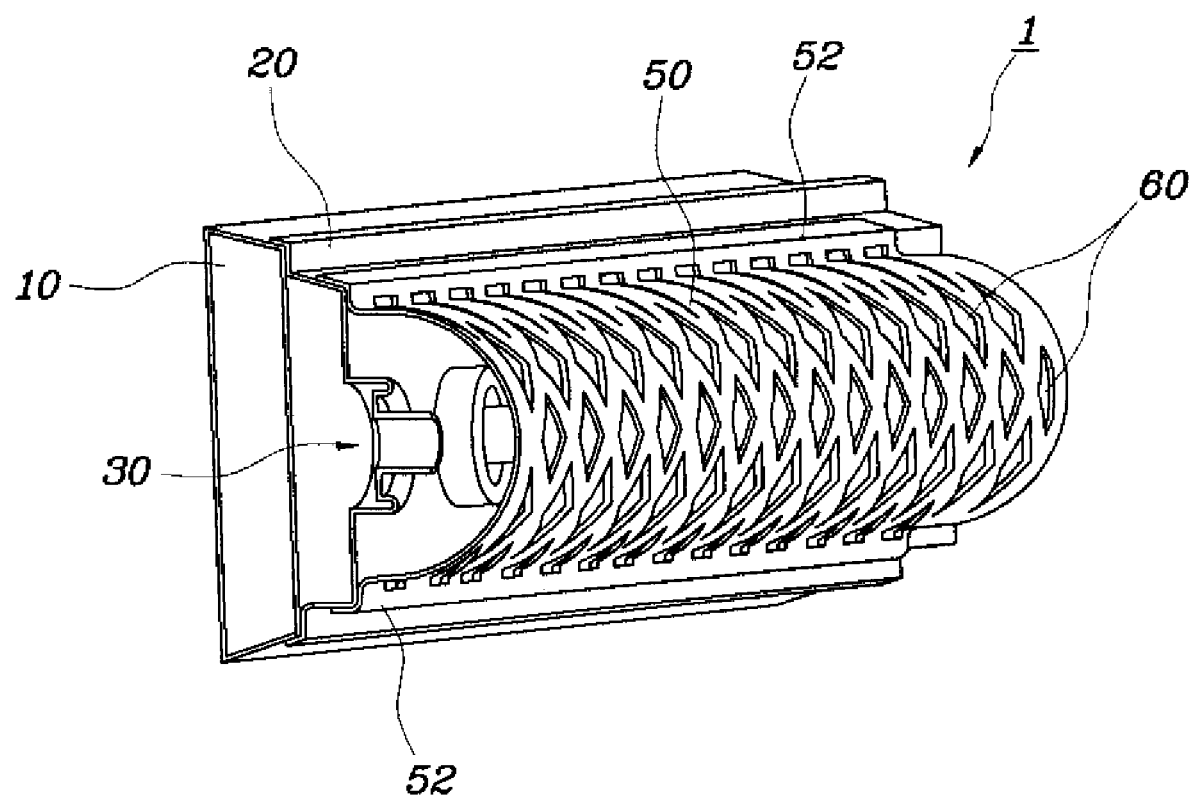
FIG. 3 is a partial perspective view illustrating the assembled bumper apparatus with the multistage energy absorbing structure according to the present invention.

As shown in FIG. 3, in the bumper apparatus 1 with the multistage energy absorbing structure according to an exemplary embodiment of the present invention, the rear shock absorber 20 is mounted to the front surface of the back beam 10 by fitting the fitting lugs 24 of the rear shock absorber 20 into the fitting holes 12 of the back beam 10. Further, the front shock absorber 50 is mounted to the front surface of the rear shock absorber 20 by fitting the fitting lugs 54 into the fitting holes 42 formed on the right-angled surface 38*b* of the first protrusion part 32.

Here, the rear shock absorbing units 30 of the rear shock absorber 20 are placed inside the arcuate cross-section of the front shock absorber 50. The bumper cover 70 is securely mounted to the front surface of the front shock absorber 50.

When an external shock is applied to the bumper apparatus 1 having the sequentially overlapping cross-sectional structure, the bumper apparatus 1 executes a multistage shock absorbing action and then restores its original shape, as shown in FIGS. 4A through 4E.

Figure 4A:
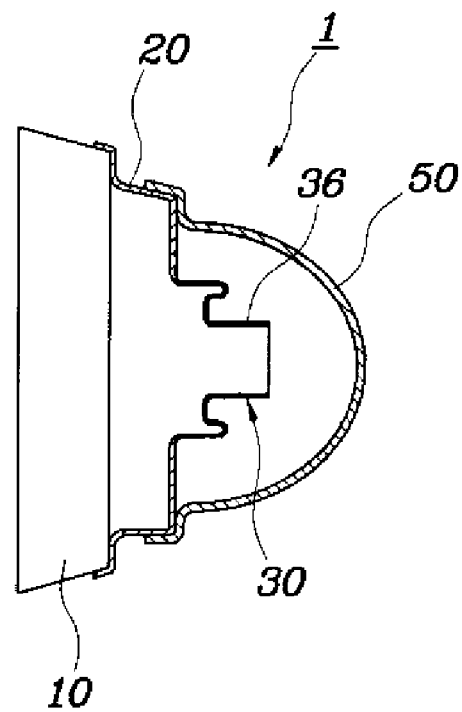
FIGS. 4A through 4E are views illustrating the sequential operation of the bumper apparatus with the multistage energy absorbing structure in collision according to the present invention.
Figure 4B:
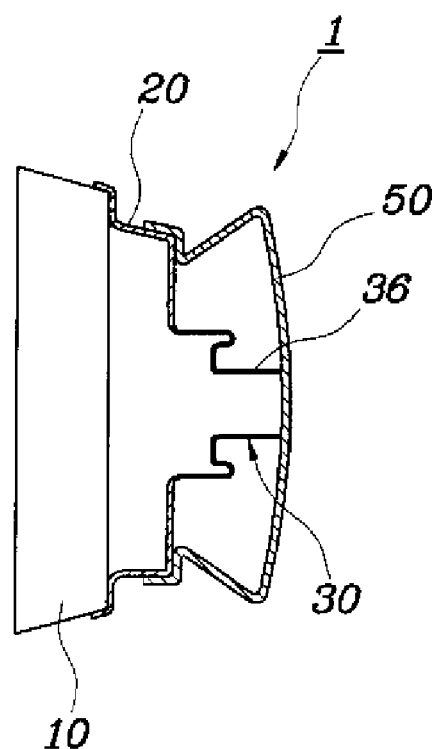

First, as shown in FIG. 4A, the external shock is primarily applied to the front shock absorber 50. Thus, the front shock absorber 50 is primarily deformed, as shown in FIG. 4B, so that the front shock absorber 50 having the arcuate cross-section is thrust to the rear shock absorbing units 30 of the rear shock absorber 20, thus executing a primary shock absorbing action.

Figure 4C:
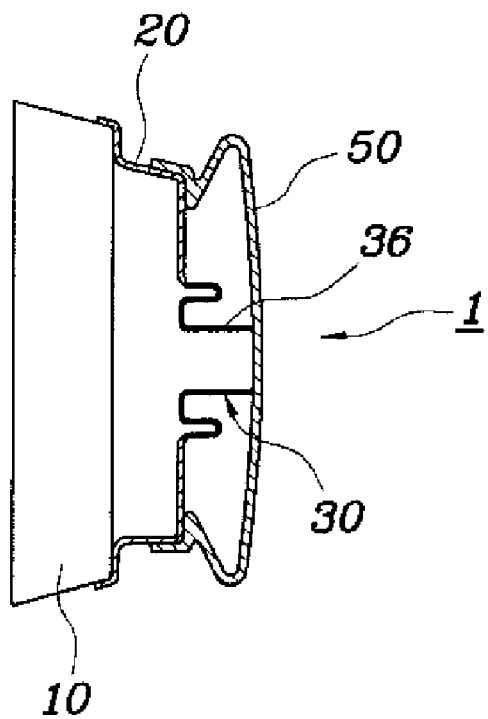
Figure 4D:
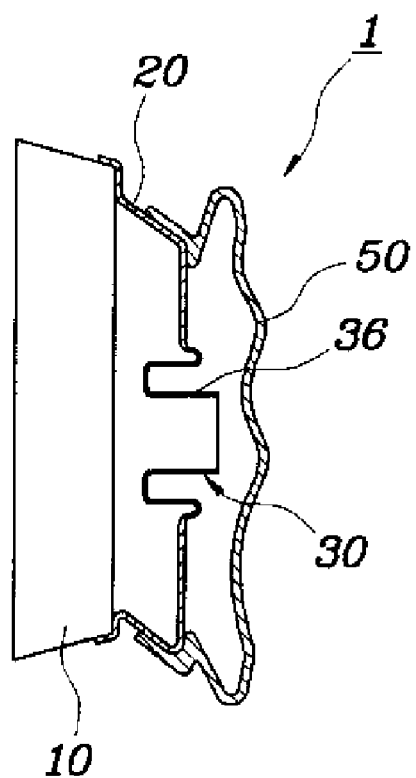

When the external shock is higher than the elastic stress of the front shock absorber 50 in the above state, the front shock absorber 50 presses the rear shock absorbing units 30 of the rear shock absorber 20 as shown in FIG. 4C. Thus, in the rear shock absorber 20, the second protrusion parts 36 are compressed so as to be telescopically collapsed into the first protrusion parts 32 around the depressed neck parts 34. During the above-mentioned action, the bumper apparatus executes a secondary shock absorbing action since the inclined surface 38*a* having at least a predetermined curvature provides elasticity against the external shock. However, when the second protrusion parts 36 of the bumper apparatus fails to absorb the external shock using the secondary shock absorbing action, the rear shock absorber 20 is compressed and deformed to execute a third shock absorbing action.

Described in detail, to absorb the external shock remaining in the bumper apparatus after the secondary shock absorbing action of the rear shock absorbing units 30 has been executed, the second protrusion part 36 of the rear shock absorber 20 is thrust rearwards and compressed downwards, thus executing a third shock absorbing action, wherein the first protrusion part 32 is collapsed toward the back beam 10 as the second protrusion part 36 of the rear shock absorber 20 is thrust rearwards. The third shock absorbing action is executed within an elastic deformation zone, so that both the front shock absorber 50 and the rear shock absorber 20 are in respective elastic restorable states.

The triple-stage elastic shock absorbing action provides an excellent shock absorbing effect, which can satisfactorily meet the requirements in the bumper standards for protecting pedestrians, car bodies and passengers in a collision.

Figure 4E:
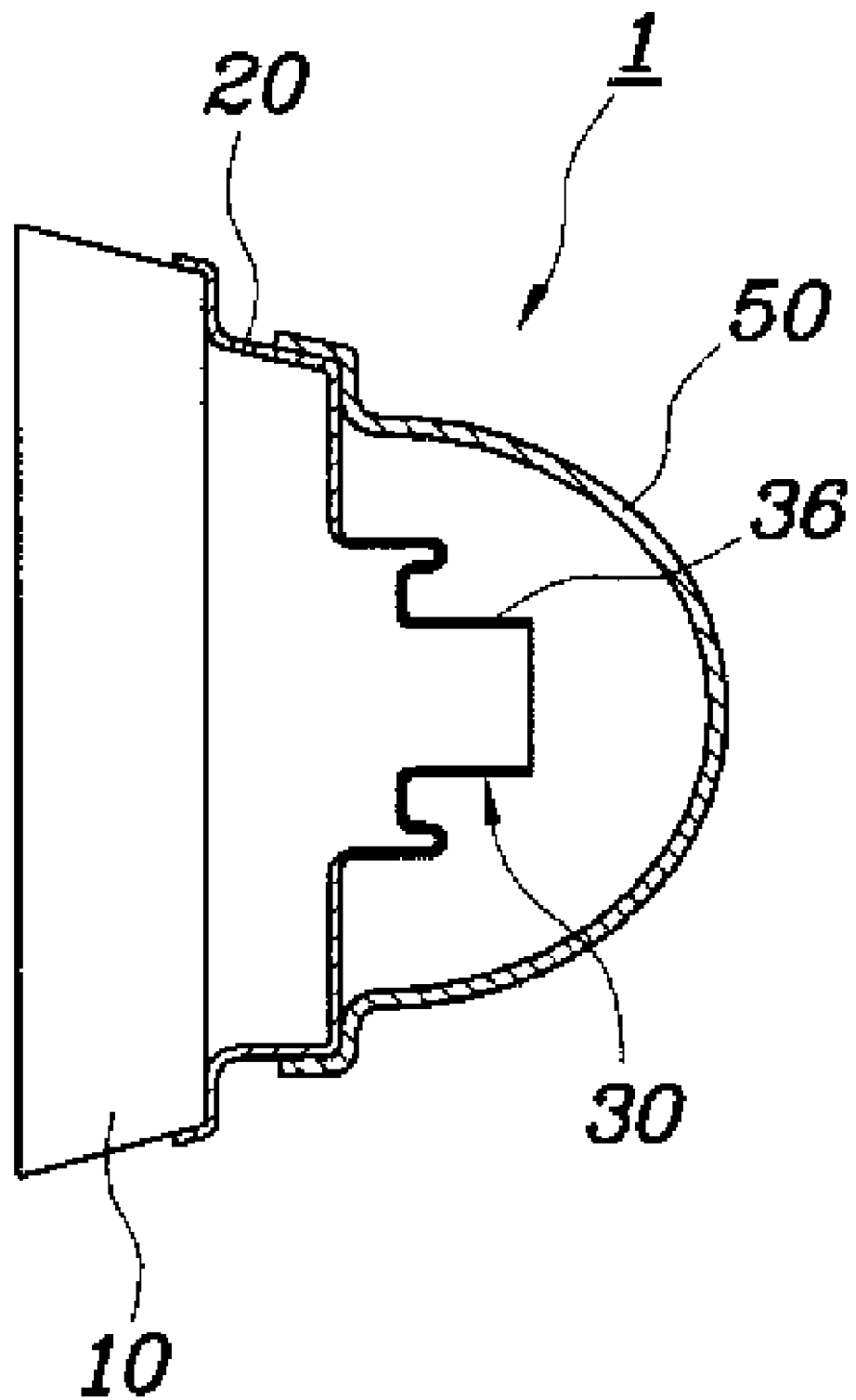

If the external shock is higher than the third elastic shock absorbing force, the bumper apparatus 1 is plastically deformed and the shape thereof is broken. However, if the external shock does not exceed the third elastic shock absorbing force, the bumper apparatus 1 can successfully absorb the shock, and restores its original shape after the shock absorbing action, as shown in FIG. 4E.

As is apparent from the above description, the bumper apparatus 1 according to the present invention confers advantages in that it has a multistage impact energy absorbing structure capable of executing the primary shock absorbing action using the front shock absorber 50, the secondary shock absorbing action using the rear shock absorbing units 30 of the rear shock absorber 20, and the third shock absorbing action using the compression of the absorber body 22 of the rear shock absorber 20. Thus, the bumper apparatus of the present invention realizes a continuous and reliable shock absorbing effect without being easily broken in a collision. Therefore, the bumper apparatus, executing a multistage shock absorbing action in a collision, satisfactorily meets the requirements in the bumper standard for protecting pedestrians, car bodies and passengers, and easily restores its original shape after the collision.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A bumper apparatus with a multistage energy absorbing structure comprising:
   a back beam securely mounted to a car body;
   a rear shock absorber securely mounted to a front surface of the back beam, the rear shock absorber comprising at least a rear shock absorbing unit formed substantially on a middle portion and in a longitudinal direction thereof and an absorber body securely covering the front surface of the back beam and supporting the at least a rear shock absorbing unit;
   a front shock absorber securely mounted to a front surface of the rear shock absorber and covering the at least a rear shock absorbing unit; and
   a bumper cover securely mounted to the front shock absorber;
   wherein the rear shock absorbing unit comprises at least two-stepped protrusion protruding forwards from the rear shock absorber, the at least two-stepped protrusion being telescopically deformable toward the back beam when an external shock is applied to the bumper cover, and one of the at least two-stepped protrusion has an asymmetrical structure with an inclined surface defined on an upper edge of the absorber body and a right-angled surface defined on a lower edge of the absorber body when the external shock is not applied to the bumper cover; and
   wherein the front shock absorber has a hollow semicircular or hollow oval cross-section and surface thereof includes a mesh structure.

2. The bumper apparatus with the multistage energy absorbing structure according to claim 1, wherein the inclined surface is formed to be concavely curved toward the front shock absorber with a curvature to form a semi-circular shape.

3. The bumper apparatus with the multistage energy absorbing structure according to claim 1, wherein the at least two-stepped protrusions of the rear shock absorbing unit comprises:
   a first protrusion part extended from the absorber body;
   a second protrusion part aligned substantially coaxial with the first protrusion part, wherein cross-section of the second protrusion part is smaller than cross-section of the first protrusion part; and
   the inclined surface defined between the first protrusion part and the second protrusion part and having at least a curvature toward the first shock absorber, one end of the inclined surface connected to upper edge of the first protrusion par; and
   a depressed neck part, one end of the depressed neck part connected to the other end of the inclined surface, and the other end of the depressed neck part connected to lower edge of the second protrusion part,
   wherein a lower edge of the first protrusion part is positioned lower than the lower edge of the second protrusion part and the upper edge of the first protrusion part is positioned above the lower edge of the second protrusion part.

4. The bumper apparatus with the multistage energy absorbing structure according to claim 3, wherein the first and second protrusion parts are cylindrical.

5. The bumper apparatus with the multistage energy absorbing structure according to claim 3, wherein the rear shock absorber is provided with at least a fitting lug protruding rearwards from the absorber body, thus being mounted to the back beam through fitting.

6. The bumper apparatus with the multistage energy absorbing structure according to claim 1, wherein the front shock absorber has an arcuate cross-sectional structure.

7. The bumper apparatus with the multistage energy absorbing structure according to claim 1, wherein the front shock absorber is provided with a plurality of polygonal holes, which are sequentially arranged over the front surface of the rear shock absorber.

8. The bumper apparatus with the multistage energy absorbing structure according to claim 1, wherein the front shock absorber is provided with a plurality of fitting lugs, thus being mounted to the rear shock absorber through fitting.

9. The bumper apparatus with the multistage energy absorbing structure according to claim 1, wherein shock absorbing performance of the front shock absorber can be adjusted by changing thickness thereof and/or by changing a shape of holes of the mesh structure.

* * * * *